United States Patent

[11] 3,542,380

| [72] | Inventors | Klaus Klein<br>Cheglio Di Taino (VA);<br>Luc Verheyden, Ispra, Italy |
|---|---|---|
| [21] | Appl. No. | 752,346 |
| [22] | Filed | Aug. 13, 1968 |
| [45] | Patented | Nov. 24, 1970 |
| [73] | Assignee | European Atomic Energy Community<br>(Euratom)<br>Brussels, Belgium |
| [32] | Priority | Oct. 4, 1967 |
| [33] | | Germany |
| [31] | | No. 1,625,993 |

[54] RING SEAL
4 Claims, 1 Drawing Fig.

[52] U.S. Cl. .................................................. 277/180,
277/206, 277/209
[51] Int. Cl. ...................................................... F16l 19/02;
F16j 19/02

[50] Field of Search............................................ 277/180,
206.1, 211, 236, 190, 209

[56] References Cited
UNITED STATES PATENTS

| 1,721,325 | 7/1929 | Wilson ......................... | 277/180X |
| 1,825,962 | 10/1931 | Laird ............................. | 277/180UX |
| 3,047,301 | 7/1962 | Taylor et al................... | 277/210X |
| 3,272,519 | 9/1966 | Voitik .......................... | 277/92 |

FOREIGN PATENTS

| 967,538 | 8/1964 | Great Britain................ | 277/180 |

*Primary Examiner*—Samuel C. Rothberg
*Attorney*—Stevens, Davis, Miller & Mosher

ABSTRACT: A ring seal with an X-shaped profile, one symmetry axis of which, when in the relaxed state is inclined with respect to the sealing plane by an angle of about 10°. When sealing pressure is applied this angle becomes zero by elastically deforming the total seal structure and not only the lips.

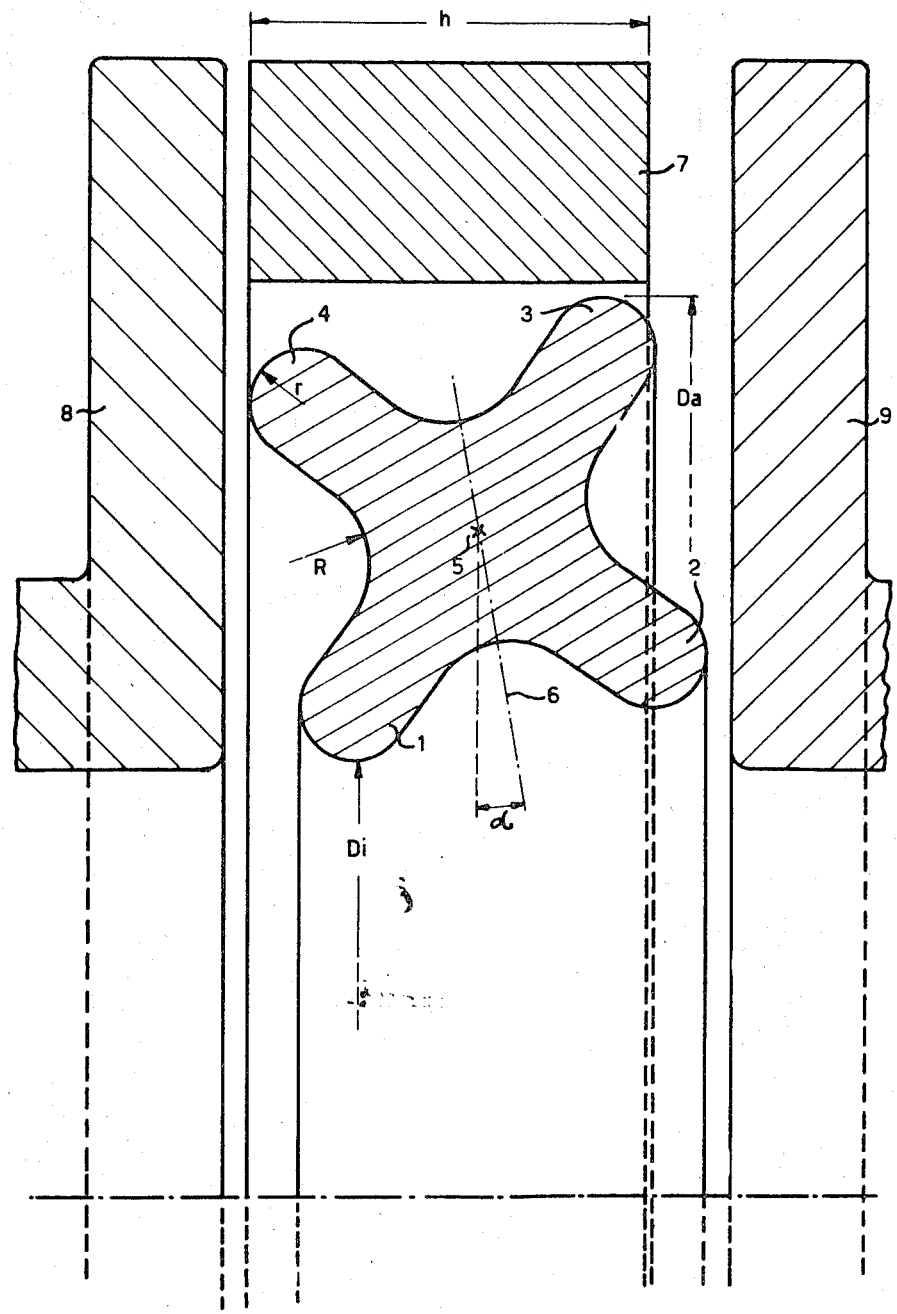

RING SEAL

The invention relates to a ring seal having an X-shaped cross section and adapted to be clamped between two opposed sealing surfaces of two relatively stationary members, such as flanges.

Seals of the kind specified are already commercially available, for instance under the trade name "Bar-x-Seals". The X-shaped cross section defines four arms, two of which must bear at their ends against each sealing surface. To this end, the ring seal is often prestressed by two concentric loading rings which press into the X-shaped cross section on both sides parallel with the sealing surface. The arms are expanded away from the loading rings and in the direction of the sealing surfaces. This loading system is not completely satisfactory, since it is expensive and the seal is unreliable. The loading system is unable to yield resiliently, to ensure that the joint remains sealed, even if the the thermal expansion of the members is unequal - i.e., with some increase in the size of the gap to be sealed.

According to the invention, there is provided a ring seal with an X-shaped cross section to be clamped between two relatively stationary members such as flanges, characterised in that when the ring is free of constraint the X-shaped cross section is so orientated with respect to the plane containing the annular axis of the ring section that an axis of symmetry between two pairs of opposed arms of the section lies an angle of between 5° and 40° to the said plane.

Preferably the said angle is between 10° and 20°.

It is also preferred that the ring seal according to the invention is used in combination with a rigid concentric spacer ring whose axial length is such as to prevent compression of the sealing ring beyond the point where all four of the arms contact the stationary members.

The free ends of the arms of the X-shaped or the sealing lips thereof may be of semicircular configuration.

The ring seal according to the invention therefore differs from the prior art seals by the feature that when it is applied to the sealing surface the ring seal according to the invention is slightly deformed resiliently, so that it is automatically prestressed without the use of loading rings. The prestressing applies to the resilience of the whole ring and not only to the outer lip zone, so that with the same modulus of elasticity, the ring according to the invention is better able to yield without loss of sealing-tightness if the size of the gap to be sealed increases. The pressure required on the sealing surface can therefore be low.

The invention will now be described in greater detail with reference to the single drawing, which is a section through the ring seal according to the invention. The circular ring has an inside diameter $D_i$ and outside diameter $D_a$. The X-shaped cross section of the ring has four arms 1—4 disposed symmetrically in relation to the toroidal or annular centre 5. The arms terminate in lips with the configuration of an arc of a semicircle of radius $r$, , a trough of radius R being disposed between each two lips. The plane containing the annular centre 5 is parallel with the sealing surfaces of the members to be interconnected i.e., parallel with the planes of two flanges 8, 9. In operation, all four lips bear against the two sealing surfaces, and an axis 6 of symmetry of the X-shaped cross section extends parallel with the sealing planes. Unlike the prior art X-shaped rings seals, however, this position of the axis of symmetry is produced by the deformation of the ring when the two sealing planes are pressed towards one another to clamp the ring. When the ring is released and free of constraint, the axis 6 is displaced by an angle $\alpha$ around the toroidal centre 5 in relation to the plane containing the centre so that the overall axial height of the ring is increased by a factor $(1+\tan \alpha)$ in relation to the distance between two lips. This increase in the overall height represents the maximum amount by which the sealing gap can increase in size up to which the seal still performs its function. The flanges are therefore preferably pressed together until the ring has become deformed to such an extent that the angle $\alpha$just disappears. Preferably, this condition is determined by means of a supporting ring 7 whose overall axial length $h$ is slightly smaller than the selected overall height of the ring seal in the operational condition. However, the ring 7 can be omitted, if the aforementioned seal is ensured by monitoring the thrust of the flanges. Nevertheless its use is recommended more particularly when the seal is used at high pressure, to prevent the X-shaped cross section from being s excessively compressed between the flanges.

In normal operating conditions, therefore, the ring seal contacts each flange by two lips. As in the prior art X-shaped rings seals, any increase in the pressure against which the seal is to be provided automatically increases the thrust of the inner lips against the flanges, thus increasing the reliability of the seal.

With the specific profile of this seal, the chamber or trough between the two lips bearing against the same flange could also be filled with a liquid whose pressure might under certain circumstances to be controlled from outside, thus enabling the sealing-tightness of the system to be constantly monitored.

The material from which the ring according to the invention is made is selected in dependence on the material of which the flange is made and on other requirements, such as temperature resistance, thermal expansion, chemical resistivity, surface texture of the flanges, and the like. For instance, in practice rings were tested having the following values:-

$$r = 0.5 \text{ mm.}$$
$$\alpha = 10°$$
$$D_i = 82 \text{ mm.}$$
$$D_a = 88.9 \text{ mm.}$$

With these dimensions the following results were obtained:

a. Ring seal of rust-resistant steel (austenitic FeNiCr-alloy) Brinell hardness  155; flanges of rust-resistant steel V2A (Brinell hardness  165), mean surface roughness better than $0.5\mu$: thrust 80—100 kg. per mm. of ring seal length: Before, during and after 57 heating cycles at 400° C., the permeability was lower than $10^{-9}$ torr per litre per second at 1 atmosphere absolute mercury pressure with respect to vacuum. The heating and cooling were performed slowly. After disassembly, the flange surfaces were found to be slightly marked.

b. Ring seal of CrFeNi 14/6/80 Inconel 600 (Wiggin), Brinell hardness up to 290, and $30\mu$ of silver vaporised on; flanges of rust-resistant steel, Brinell hardness 155, mean surface roughness $0.6\mu$; thrust with hydraulic press, constant 18.6 kg./mm. at 20° C., 3 atmospheres absolute mercury with respect to vacuum $10^{-3}$ mm. of mercury. Leakage: $< 5.10^{-10}$ torr per litre per second. Thereafter the flange surface was slightly marked by the inner ring with a groove 0.01 mm. in depth; there were three further grooves of lesser depth. The angle $\alpha$ was reduced to 1° 10'. No sensitivity to higher outward pressure up to 11 atmospheres absolute.

c. Ring seal of rust-resistant steel "Phonixil" (nonrusting, austenitic, nonmagnetic manganese-chromium steel), Brinell hardness ** 215.

The same flanges were used as in b. 20° C., 37.3 kg./mm.; Leakage: $< 5.10^{-10}$ torr per litre per second; at 26.1 kg./mm.; Leakage: $= 10^{-9}$ torr per litre per second; at 18.6 kg./mm.; Leakage: $= 6.10^{-9}$ torr per litre per second.

In five insertions and extractions at 47 kg./mm. and 20° C. leakage rates were found in each case of $< 5.10^{-10}$ torr per litre per second. The grooves were much smaller than with Inconel (example b ) and the angle $\alpha$ was reduced to 3°.

Of course, these values do not limit the use of the invention. It was found that the sealing effect can be increased by reducing the surface roughness of the lips. For instance, a soft metal, such as gold or silver, could be vaporised on to the lips, as was done in example b.

We claim:

1. A ring seal with an X-shaped cross section to be clamped between two relatively stationary members being so shaped that when the ring is free of constraint the X-shaped cross section is so orientated with respect to the plane passing through the annular axis of the seal that an axis of symmetry between two pairs of opposed arms of the section lies at an angle of between 5° and 40° to the said plane.

2. A ring seal as claimed in claim 1 in which the said angle is between 10° and 20°.

3. A ring seal as claimed in claim 1 in combination with a concentric spacer ring of axial length such as to prevent compression of the sealing ring beyond the point when all four of the arms contact the stationary members.

4. A ring seal as claimed in claim 1 in which the free ends of the arms of the X-shape are of semicircular configuration.